United States Patent [19]

Hurst et al.

[11] 4,278,450

[45] Jul. 14, 1981

[54] METHOD FOR THE RECOVERY OF CLEAN PYROLYSIS OFF-GAS AND A ROTARY RECYCLING MEANS THEREFOR

[75] Inventors: David R. Hurst, Norcross; Lewis W. Elston, Atlanta, both of Ga.

[73] Assignee: Georgia Tech Research Institute, Atlanta, Ga.

[21] Appl. No.: 82,857

[22] Filed: Oct. 9, 1979

[51] Int. Cl.³ ............................................. B01D 50/00
[52] U.S. Cl. ........................................ 55/80; 55/269; 55/400; 55/461; 55/473; 55/338
[58] Field of Search ................. 55/80, 1, 268, 269, 55/400, 418, 423–426, 338–340, 461, 473; 165/111, 109, 113; 415/53 R, 62

[56] References Cited

U.S. PATENT DOCUMENTS

| | | |
|---|---|---|
| 492,081 | 2/1893 | Wright ................................. 55/424 |
| 1,877,322 | 9/1932 | Hulse ................................... 165/109 |
| 1,958,816 | 5/1934 | Gibson . |
| 2,030,612 | 2/1936 | Sturtevant . |
| 2,109,478 | 3/1938 | Gay . |
| 2,148,452 | 2/1939 | Fraser . |
| 2,187,066 | 1/1940 | Youker . |
| 2,199,015 | 4/1940 | Toensteldt . |
| 2,212,819 | 8/1940 | Ahlman . |
| 2,269,412 | 1/1942 | Sturtevant . |
| 2,286,987 | 6/1942 | Sturtevant . |
| 2,676,667 | 4/1954 | Dodge ................................. 55/267 |
| 2,797,769 | 7/1957 | Evans et al. ....................... 55/268 |
| 2,889,005 | 6/1959 | Umbricht . |
| 2,912,159 | 11/1959 | Ganger et al. ..................... 55/467 |
| 2,913,109 | 11/1959 | Williams . |
| 3,174,264 | 3/1965 | McKnab . |
| 3,234,993 | 2/1966 | Belcher . |
| 3,252,275 | 5/1966 | Tillman et al. . |
| 3,406,500 | 10/1968 | Deming . |
| 3,453,808 | 7/1969 | Neuman . |
| 3,865,022 | 2/1975 | Ahlrich . |
| 3,887,342 | 6/1975 | Bunnelle . |
| 3,892,550 | 7/1975 | Riis ..................................... 55/269 |
| 3,931,016 | 1/1976 | Lovelady . |
| 3,983,796 | 10/1976 | Ahlrich . |

FOREIGN PATENT DOCUMENTS

| | | | |
|---|---|---|---|
| 1096460 | 2/1955 | France ................................. 55/408 |
| Ad. 23456 | of 1910 | United Kingdom ............... 55/426 |
| 698755 | 10/1953 | United Kingdom ............... 55/269 |

*Primary Examiner*—Bernard Nozick
*Attorney, Agent, or Firm*—Newton, Hopkins & Ormsby

[57] ABSTRACT

A method and apparatus for stripping entrained organic vapor and solid particulate matter from a pyrolytic off-gas stream is disclosed. The off-gas is introduced at the top of a conical chamber having a variable speed "squirrel cage" rotor at its top. The wet, dirty, off-gas is drawn into the rotor from below and impinged upon the chamber walls which causes part of the organic vapor to condense and flow to the chamber bottom, thereby cleaning the chamber walls. A portion of the impinged gas is recirculated through the rotor while the remainder exits at the chamber bottom. The ratio of recycled gas to through gas is controlled by the speed of the rotor. Heating and cooling coils on the chamber walls are operable to control the rate of condensation.

17 Claims, 3 Drawing Figures

METHOD FOR THE RECOVERY OF CLEAN PYROLYSIS OFF-GAS AND A ROTARY RECYCLING MEANS THEREFOR

BACKGROUND OF THE INVENTION

1. Field of the Invention

The present invention relates to a method and apparatus for the removal of particulate matter and organic vapors from pyrolytic off-gases. More specifically, it relates to a method and apparatus in which the pyrolytic off-gases are recycled through a rotary recycling device.

2. Brief Description of the Prior Art

The pyrolytic treatment of organic substances, such as the pyrolytic treatment of heavy oil to produce gasoline, is well known. It is also well known that a pyrolytic process produces an organic off-gas which can be used as a feed stock, for chemical synthesis or as a fuel in a burner. However, the pyrolytic off-gas tends to include significant amounts of particulate solid matter and organic vapors which make the off-gas unsuitable as a fuel in devices which are sensitive to fuel impurities and which also cause undesirable emissions to the atmosphere during combustion.

Efforts have been made in the past to clean the particulate matter and organic vapors from pyrolytic off-gases. Such methods have included the use of cyclones, condensers, filters and scrubbers. However, these methods included serious disadvantages and drawbacks such as incomplete cleaning of the gas, poor product recovery, duct fires, clogging of small orifices and tubes by tars and solids and thermal damage to the pyrolytic oils resulting from the relative long residence times required for condensation in passive devices. The inability to overcome these problems has caused several research institutions to abandon pyrolysis research and has contributed to the failure of several highly publicized demonstration projects.

SUMMARY OF THE INVENTION

It is therefore an object of the present invention to provide a method and apparatus for the removal of solid particulate matter and organic vapors from a stream of pyrolytic off-gas.

It is a further object of the present invention to provide a method and apparatus in which a selected fraction of organic vapor can be condensed from the pyrolytic off-gas.

It is a further object of the present invention to provide a method and apparatus in which the off-gas is recycled in a variable ratio to permit an optimum balance of stripping and power consumption for a variety of feeds and emission limits.

It is a further object of the present invention to provide a method and apparatus which causes minimal thermal damage to the pyrolytic oils.

It is a further object of the present invention to provide a method and apparatus in which small orifices and tubes are not clogged by accummulated tars and solids.

It is a further object of the present invention to provide an apparatus which is self cleaning during operation.

It is a final object of the present invention to provide a rotary recycling apparatus which is simple and inexpensive to construct.

Accordingly, in the present invention, a wet, dirty, pyrolytic off-gas is produced in a pyrolytic process as is well known in the art. The wet, dirty, pyrolytic off-gas is then transported to the apparatus of the present invention. This apparatus consists of a substantially closed chamber which is preferably in the form of an inverted cone. A variable speed rotor is located in the interior of the cone near its top. The variable speed rotor is preferably of the "squirrel cage" type and is in the form of a cylinder having rotor blades along its periphery, a closed top surface and an open bottom surface. A stripped gas outlet and condensed organic vapor outlet are located at the bottom of the chamber. The wet, dirty, pyrolytic off-gas is introduced at the top of the chamber by either a forced gas blower upstream from the chamber inlet or by a suction blower downstream from the stripped gas outlet. As the off-gas is introduced in the chamber, it flows around the rotor and downward in the direction of the stripped gas outlet. However, as it moves into the area immediately adjacent the downstream end of the rotor, the off-gas is drawn into the rotor and is centrifugally flung in a substantially horizontal direction to impinge upon the side walls of the chamber. As the wet, dirty, off-gas impinges upon the side walls of the chamber, a portion of the organic vapor is condensed on the walls and a portion of the particulate matter remains with the condensed vapor. The condensed vapor is then able to flow downwards towards the condensed vapor outlet for further processing.

The configuration of the walls of the chamber is such that the impinged off-gas tends to flow back towards the area immediately adjacent the downstream and of the rotor. A portion of this impinged gas is therefore recycled back into the rotor for further impingement and condensation of the entrained vapor. The remainder of the impinged gas is able to flow downward toward the gas outlet under the influence of the forced air blower or the suction blower. The precise proportion of gas which is recycled to gas that which proceeds to the gas outlet can be controlled by the velocity of the rotor. It is therefore possible to precisely control the ratio of vapor and particulate solids which is removed from the off-gas.

Heating or cooling means may be incorporated into the walls of the chamber to control the temperature of the chamber walls. By selecting a desired temperature for the chamber walls, it is possible to further control the precise degree of condensation of entrained vapor during the impingement of the off-gas upon the chamber walls, thereby selecting the condensate fraction which is to be removed.

The flow of condensed vapor down the walls of the chamber affectively cleans the chamber during operation. Further, the apparatus lacks small orifices and tubes which might be susceptible to clogging by accummulated tars and solids. Further, the apparatus is simple and easily constructed while the method provides for rapid treatment of the off-gas to thereby minimize thermal damage to the pyrolytic oils.

BRIEF DESCRIPTION OF THE DRAWINGS

Various other objects, features and attendant advantages of the present invention will be more full appreciated as the same becomes better understood from the following detailed description when considered in connection with the accompany drawings, wherein like reference characters designate like or corresponding parts throughout the several views, and wherein.

DETAILED DESCRIPTION OF THE PREFERRED EMBODIMENT

The method and apparatus of the present invention will be now be described with reference to the attached FIGURES in which the numbering of the various elements will remain constant throughout the various FIGURES.

Figure 1:
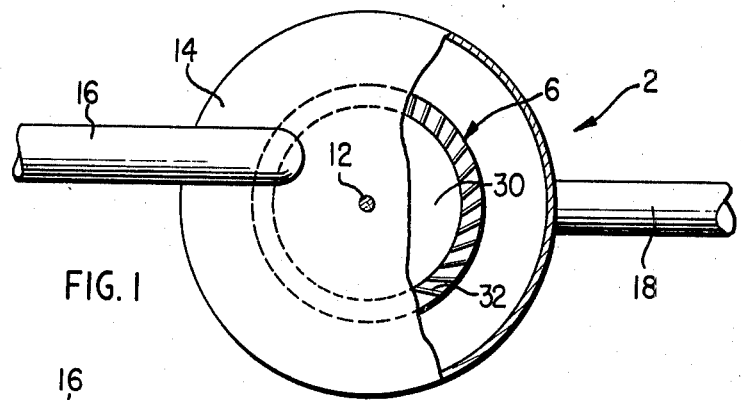
FIG. 1 is a top view, partially cut away, of the apparatus of the present invention.
Figure 2:
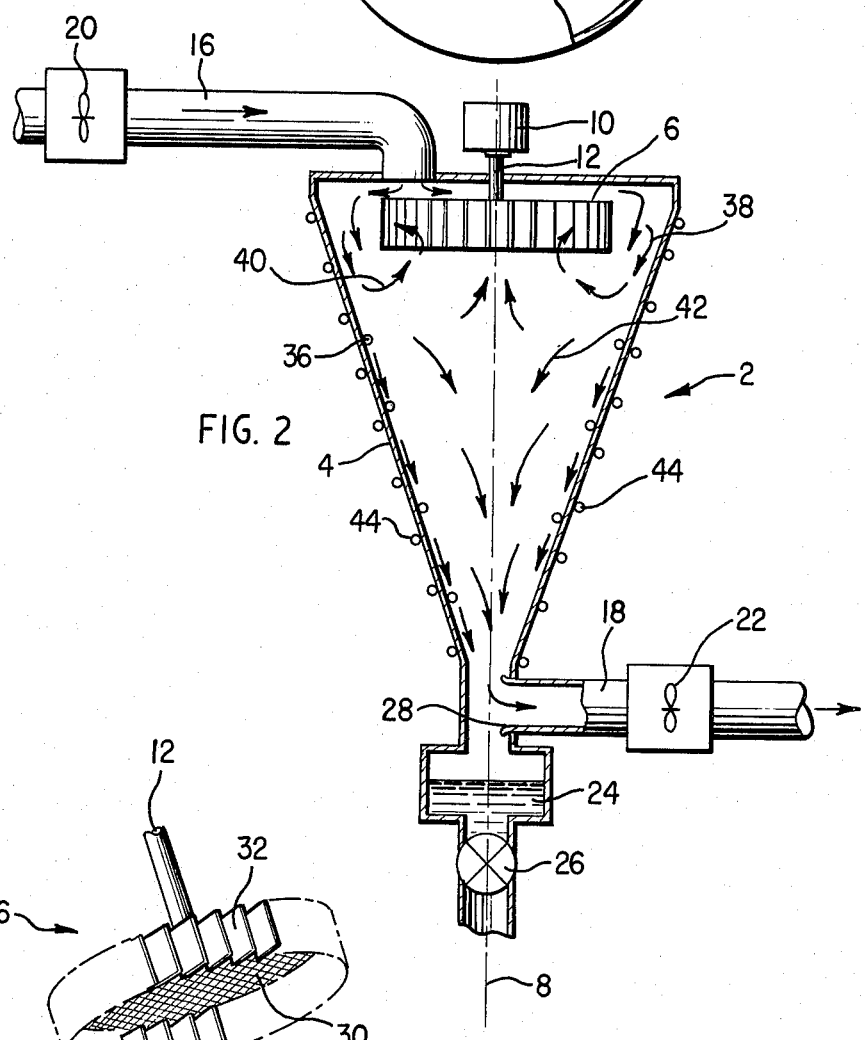
FIG. 2 is a schematic cross sectional side view of the apparatus of the present invention.

As can best be seen from FIGS. 1 and 2, the apparatus of the present invention consists of a substantially closed chamber such as the inverted conical chamber 2 having tapered walls 4. Within the chamber 2, near the top thereof, is located a rotor 6 which rotates about a vertical axis which is concentric with the axis 8 of the chamber. The rotor 6 is rotated by a variable speed drive 10 through drive shaft 12 which extends through the top surface 14 of the chamber. The pyrolytic off-gas enters the chamber 2 through an inlet conduit 16 while the stripped off-gas exits the chamber through outlet conduit 18. The movement of the pyrolytic off-gas through the chamber is induced either by forced gas blower 20 or suction blower 22. A condensed vapor sump 24 at the bottom of the chamber collects condensed vapor and is controlled by valve 26 to drain the sump when desired. A baffle 28 surrounds the junction of the off-gas outlet 18 and the chamber so as to prevent condensed vapor from flowing into the off-gas outlet.

Figure 3:
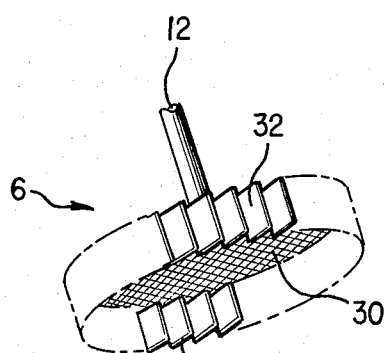
FIG. 3 is an oblique view of the rotor in the present invention, seen from slightly below elevation.

The rotor, as can best be seen from FIG. 3, is a "squirrel cage" type rotor which is in the form of a cylinder. The rotor cylinder has an open bottom, a closed top 30 and rotor blades 32 about the entire circumference of its periphery.

The preferred method of the present invention will now be described with reference to the above-described preferred embodiment of the apparatus. A wet, dirty, pyrolytic off-gas containing organic vapors and solid particulate matter of a type which is well known in the art, is vented from a pyrolytic processing apparatus into inlet conduit 16. The wet, dirty, off-gas is then either forced by forced gas blower 20, or drawn by suction blower 22, into the inlet of chamber 2 of the rotary recycling device. The off-gas, whose flow can be seen from the arrows in FIG. 2, strikes the solid top surface 30 of the rotor and flows around the rotor and downward under the action of blower 20 or 22. As the off-gas passes below the bottom edge 34 of the rotor, it becomes subject to the influence of the rapidly rotating rotor 6. As the rotor 6 rotates, the off-gas within the cylinder defined by the rotor is centrifugally forced outwards by the rotor blades in a substantially perpendicular direction. As the off-gas within the cylinder is forced outwardly, there results a suction effect which tends to draw gas from immediately below the rotor into the interior of the rotor to be subsequently forced outward by the rotor blades. This creates a continuous movement of off-gas from the area immediately below the rotor in an upwardly and outwardly direction towards the chamber walls.

As the outwardly moving off-gas stream impinges upon the outer walls 4 of the chamber, a portion of the organic vapor entrained therein condenses on the interior surface of the chamber walls 4. A portion of the solid particulate matter remains with the condensed vapor. The condensed vapor droplets 36 flow downwards, under the influence of gravity, toward the sump 24 where they are collected. As the droplets 36 flow downward, they pick up additional particulate matter which tends to clean the inner surfaces of the walls 4. The droplets 36 are prevented from entering the gas outlet 18 by the baffle 28. The impinged gas 38, after impinging upon the walls 4, tends to flow downwards under the influence of blower 20 or blower 22, and also tends to flow towards the axis 8, under the influence of the angle of the walls 4. As a result, the impinged gas moves toward the area 40 immediately adjacent the lower end of the rotor 6. Therefore, the impinged gas again becomes subject to the influence of the rotor and a portion of the impinged gas is again drawn into the rotor 6 and recycled so that it again impinges upon the walls 4. An additional portion of the intrained organic vapors are therefore condensed and the again impinged off-gas is again directed towards the area 40 immediately adjacent the lower end of the rotor 6.

Not all of the impinged gas is recycled through the rotor 6. Due to the influence of the blower 20 or the blower 22, a portion 42 of the impinged gas continues to travel downwards and out of the chamber through the outlet 18 to a further process such as a chemical reactor or burner. By controlling the rate of rotation of the rotor, it is possible to select the ratio of recycled off-gas to the ratio of through off-gas 42 so that a desired degree of organic vapor stripping can be achieved.

A heating and a cooling device, such as coils 44 may be provided on the walls 4 of the chamber. The coils 44 can be activated to selectively heat or cool the chamber walls as desired. By selectively heating or cooling the chamber walls, one may control the rate of condensation of entrained organic vapor for each cycling of the off-gas through the rotor. It is therefore possible to select the desired fraction of the entrained organic vapor in the off-gas stream which is to be condensed during impingement upon the walls. By cooling the walls, one may condense both oils and water, or by heating the walls, one may condense only heavy oil leaving the water vapor and volatile organics in the output gas stream.

The rotor itself is continuously cleaned during operation by centrifugal force and by the flow of the off-gas through the rotor.

If desired, two or more of the rotary recycling devices may be connected in series with walls of different temperatures so that different fractions of the entrained organic vapors can be selectively condensed in each device.

The chamber 2 need not be an inverted cone but can be cylindrical, spherical or any other shape provided only that the off-gas expelled by centrifugal force from the rotor can impinge against the walls and will be directed back towards the inlet of the rotor.

The direction of flow of the off-gas can be downward, upward, horizontal, or any other direction so long as the overall throughput direction is parallel to the axis of rotation of the rotor.

The inner wall of the vessel may be smoothed, ribbed, rough, or any other surface texture best suited to the material being processed. Heating or cooling may supplied to the container's outer wall by any desired method.

The rotor may be of any design which draws gas from its downstream side and expels it by centrifugal force towards the wall of the chamber.

In the case of fine droplets of liquid which are entrained in the incoming off-gas, the relatively large droplets which strike the upper surface of the rotor are divided into a fine aerosol prior to reaching the lower side of the rotor where they are drawn into the rotor for recycling. This feature improves the self cleaning properties of the device and reduces the amount of power required for its operation.

The apparatus of the present invention is a simple, inexpensive device which can be of any size depending only upon the volume of the off-gas stream which is to be processed.

Further, the apparatus and method of the present invention are not limited to the cleaning of pyrolytic off-gas. Indeed, the method and apparatus are usable with any type of wet, dirty gas stream. For example, the method and apparatus of the present invention could be used to clean the off-gas from smelters, incinerators, restaurant kitchen stacks, etc.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for cleaning off-gas having particulate solids and organic vapors entrained therein, said method comprising the steps of:
introducing said off-gas into the upstream end of a substantially closed chamber;
utilizing a rotor rotating about an aixs which is parallel to the overall direction of off-gas flow, to radially deflect said off-gas so that said off-gas impinges upon a wall of said chamber and to draw off-gas only from adjacent the downstream side of said rotor and force said off-gas in a substantially radial direction so as to impinge upon the walls of said chamber whereby a portion of said vapors are condensed and recovering purified gas.

2. The method of claim 1 wherein said off-gas is a pyrolytic off-gas.

3. The method of claim 2 including the step of:
adjusting the velocity of rotation of said rotor whereby said recirculation is performed an optimum number of times for a given portion of said off-gas.

4. The method of claim 3 including the steps of:
permitting said condensed vapor to drain towards said downstream end;
withdrawing said condensed vapor through an outlet at said downstream end; and
withdrawing said clean off-gas through a second outlet at said downstream end.

5. The method of claim 3 including the step of heating said chamber walls.

6. The method of claim 3 including the step of cooling said chamber walls.

7. An off-gas cleaning apparatus comprising:
a substantially closed chamber having an axis;
means for introducing off-gas having particulate solids and organic vapors entrained therein, into the upstream axial end of said chamber;
means associated with said chamber for inducing said off-gas to move towards the downstream axial end of said chamber;
rotor means adjacent said upstream axial end of said chamber and adapted only for centrifugally inducing a portion of said off-gas from an area downstream of said rotor means to move in a radial direction to peripheral walls of the chamber, said rotor means rotating about an axis parallel to said chamber axis;
means for impinging said off-gas and condensing said vapors in said radially moving off-gas, said means for impinging and condensing comprising the peripheral walls of said chamber;
an outlet for said condensed vapor downstream from said rotor means; and
an outlet for said off-gas downstream from said rotor means, wherein said rotor means is in the form of a cylinder being coaxial with said chamber axis and having rotor blades about the entire circumference of its peripheral surface, an open downstream axial surface and a closed upstream axial surface whereby only off-gas from the downstream side of said rotor means is drawn into said rotor means.

8. The off-gas cleaning apparatus of claim 7 wherein said means for introducing off-gas communicates with a pyrolytic treatment apparatus.

9. The off-gas cleaning apparatus of claim 7 or claim 8 wherein said peripheral walls of said chamber include heating and cooling means.

10. The off-gas cleaning apparatus of claim 7 or claim 8 including a baffle adjacent said off-gas outlet.

11. The off-gas cleaning apparatus of claim 7 or claim 8 including variable speed means for rotating said rotor means.

12. The off-gas cleaning apparatus of claim 7 or claim 8 wherein said peripheral walls of said chamber are of a form which causes said impinged off-gas to be directed adjacent the area immediately downstream from said rotor means.

13. The off-gas cleaning apparatus of claim 12 wherein said chamber is in the form of a cone whose apex is in said downstream direction.

14. An off-gas cleaning apparatus comprising:
a source of off-gas having particulate solids and vapors entrained therein;
a substantially closed conical chamber having an axis, an upstream base end and a downstream apex end;
conduit means connected between said source and said upstream end of said chamber for introducing said off-gas into said chamber;
means associated with said chamber for inducing said off-gas from said upstream end towards said downstream end;
a rotor adjacent the upstream end of said chamber, said rotor being of the squirrel cage type and comprising a cylinder rotatable about an axis which is coaxial with said chamber axis, said cylinder having rotor blades on its peripheral walls, an open downstream axial surface and a closed upstream surface;
variable speed means for rotating said rotor whereby only off-gas from adjacent the downstream end of said rotor is radially expelled from said rotor to impinge upon the peripheral walls of said chamber whereby a portion of said entrained vapor is condensed and flows downward, said conical peripheral walls further causing said impinged off-gas to be directed adjacent the area immediately downstream from said rotor so that a portion of said impinged off-gas is recirculated through said rotor;

heating and cooling means associated with said peripheral walls;

a clean off-gas outlet at said downstream apex of said chamber;

a condensed vapor outlet at said downstream apex of said chamber; and a baffle partially covering said clean off-gas outlet.

15. The off-gas cleaning apparatus of claim 14 wherein said source of off-gas is a pyrolytic treatment apparatus and said vapors are organic vapors.

16. The off-gas cleaning apparatus of claim 7 or claim 15 wherein said means for inducing said off-gas to move towards said downstream end is a suction means located downstream from said off-gas outlet.

17. The off-gas cleaning apparatus of claim 7 or claim 15 wherein said means for inducing said off-gas to move towards said downstream end is a forced gas blower located upstream from said rotor.

* * * * *